United States Patent Office 3,397,176
Patented Aug. 13, 1968

3,397,176
TWO-STEP PROCESS FOR PREPARING ALKYD RESINS FROM GLYCIDYL ESTERS OF ALPHA-BRANCHED MONOCARBOXYLIC ACIDS, POLYHYDROXY COMPOUNDS AND PHTHALIC ANHYDRIDE
Jacques J. J. Drost, Amsterdam, Netherlands, assignor to Shell Oil Company, New York, N.Y., a corporation of Delaware
No Drawing. Continuation-in-part of application Ser. No. 90,615, Feb. 21, 1961. This application June 10, 1966, Ser. No. 556,564
Claims priority, application Netherlands, Feb. 29, 1960, 248,912
6 Claims. (Cl. 260—47)

This application is a continuation-in-part application of copending application Ser. No. 90,615, filed Feb. 21, 1961, now abandoned.

The present invention relates to a novel two-step process for preparing chemical-resistant alkyd resins, and more particularly the invention relates to improvements in alkyd resins obtained by reacting esters of alpha alkyl monocarboxylic acids containing an epoxy group in the alcoholic part of the ester or molecule with polybasic carboxylic acids or anhydrides thereof.

Alkyd resins obtained in the usual manner by reacting a polyol with phthalic anhydride and a fatty acid are only slightly resistant to acids and bases. When paints or varnishes containing these alkyd resins and applied to metal sheets are treated with a dilute aqueous solution of an acid or a base, blisters are rapidly formed in the paint or varnish coat followed by cracks and fissures. However, alkyd resins having considerably improved properties are obtained by starting from epoxy alkyl esters of monocarboxylic acids, particularly from glycidyl esters of the monocarboxylic acids branched at the alpha position, and reacting these with polybasic carboxylic acids or anhydrides thereof. Such resins are described in the copending United States patent application, Ser. No. 29,165, filed May 16, 1960 by Nantko Kloos, now U.S. Patent No. 3,275,583, issued Sept. 27, 1966.

It has now been found that the chemical properties of such alkyd resins may be further improved when the number of carboxy groups in the main chains is limited and the fragments of these chains derived from the various monomers are partly combined to ether bonds. The latter are much less reactive than carboxy groups, since the limitation of the number of carboxy groups hampers the hydrolytic splitting of the alkyd resin molecules.

The present invention may be defined as relating to a two-step process for the production of alkyd resins, in which intermediate products are obtained by reacting polyepoxy compounds with monocarboxylic acids or by reacting epoxy alkyl esters of monocarboxylic acids with polyhydroxy compounds, and then the intermediate products are converted with polybasic carboxylic acids or anhydrides thereof into alkyd resins.

The polyepoxy compounds may be of widely varying types. They may contain two or more epoxy groups or oxyrane rings. The epoxy groups may occur as terminal groups in a chain or else in a position in which both carbon atoms of the oxyrane ring are bound outside this ring to carbon atoms. The epoxy groups may be bound to structures of an aliphatic, cycloaliphatic or aromatic type or a mixed type, for example, of the aliphatic and aromatic type. The carbon chains connecting the various epoxy groups to each other may be interrupted by atoms other than the carbon atoms, for example, by oxygen atoms, or else by divalent or polyvalent groups.

Preference is given to di(epoxyalkyl)diethers of polyhydroxy compounds of which the di(epoxyalkyl)diethers of polyhydric phenols are preferred, such as the di(epoxyalkyl)diethers of diphenylol methane, diphenylol ethane, diphenylol propane, diphenylol sulfone, hydroquinone, resorcinol and various dihydroxy diphenyls and dihydroxy naphthalenes. The epoxy alkyl groups are generally glycidyl groups but other epoxy alkyl groups, such as 2,3-epoxybutyl, 3,4-epoxybutyl, 2,3-epoxyhexyl, 2,3-epoxy-4-phenyloctyl, 1-ethyl - 2,3 - epoxyhexyl, 2,3-epoxy-4,5-diethyl dodecyl and epoxy cyclohexyl, are also usable.

Instead of di(epoxyalkyl)diethers of polyhydroxy compounds poly(epoxyalkyl)polyethers, for example, tri(epoxyalkyl) triethers of polyhydroxy compounds, may also be used.

Other very suitable ethers include the di(epoxyalkyl) diethers generally poly(epoxyalkyl)polyethers of aliphatic polyhydroxy compounds, such as those derived from various glycols, ethylene polyglycols, trimethylol propane and pentaerythritol. Reference may also be made to di(epoxyalkyl)ethers, i.e., in which two epoxy alkyl groups are connected to each other only by means of a single oxygen atom.

Still other useful diepoxy compounds are epoxidized dienes, such as 1,2,5,6-diepoxyhexane and compounds in which two epoxidized cyclohexane rings occur, for example

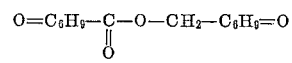

Very suitable polyepoxides include the diglycidyl ethers of dihydric phenols, particularly those diglycidyl ethers prepared by reacting 2,2-bis(4-hydroxyphenol)propane with epichlorohydrin. By varying the ratios of the dihydric phenol and epichlorohydrin one obtains different molecular weight products as described in U.S. 2,633,458 and designated as Polyether A, B, C etc.

The monocarboxylic acids used to make the epoxy esters are generally alpha-branched, saturated, aliphatic monocarboxylic acids, particularly those having at least 4 and not more than 20 carbon atoms in the molecule are preferred. Cycloaliphatic monocarboxylic acids may also be used. The important characteristic is that the acids have secondary or tertiary carboxyl groups, i.e., are alpha-branched.

Preferably, these acids are obtained by reacting with carbon monoxide and water, olefins having at least 3 carbon atoms in the molecule. This reaction takes place under the influence of acid catalysts, for example, phosphoric acid, sulfuric acid and complexes of phosphoric acid with boron fluoride. The reaction is more thoroughly described in the copending patent application of Marinus J. Waale and Johan M. Vox, Ser. No. 858,609, filed Dec. 10, 1959, now U.S. 3,059,004, issued Oct. 16, 1962. As indicated in this application, the carboxyl group adds on at the double bond and even when the double bond is terminal, the addition is such that a strong tendency for tertiary groups to be formed by isomerization. Branching at the double bond also provides a tertiary carboxyl group. Very attractive products are obtained when monoolefins having at least 8 and not more than 18 carbon atoms in the molecule are thus converted into monocarboxylic acids and subsequently via the epoxy alkyl esters of these acids into alkyd resins. Preferably, more than 10% of the monocarboxylic acids will be tertiary in the carboxyl group.

Preferred saturated aliphatic monocarboxylic acids which may be used in the present process either alone or as glycidyl esters thereof have the general formula:

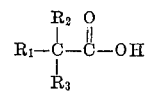

wherein $R_1$ and $R_2$ are the same or different alkyl radicals, $R_3$ is an alkyl radical or hydrogen. Particularly preferred monocarboxylic acids contain from 9 to 19 carbon atoms with 9 to 11 being especially preferred.

The epoxy alkyl esters of the above monocarboxylic acids may be prepared in any of the known ways for obtaining epoxy esters from monocarboxylic acids. A preferred method for preparing such esters is set forth in a copending United States patent application of Nantko Kloos and Jacques P. J. Drost, Ser. No. 28,865, filed May 13, 1960, and now U.S. 3,178,454, issued Apr. 13, 1965.

Briefly speaking, a monocarboxylic acid salt (for example, alkali metal salts or quaternary ammonium salt) may be reacted with epichlorohydrin. This reaction is preferably carried out by gradually adding a liquid phase consisting of epichlorohydrin or containing the latter in a stream of a concentrated solution of the salt in water, or by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

The monocarboxylic acid may also be reacted as such with epichlorohydrin with the use of nitrogen bases or salts thereof as catalysts. When monocarboxylic acids and epichlorohydrin are used in a stoichiometric ratio, or when an excess of carboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case, the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

The epoxy esters which are suitable for the present process have the following general formula:

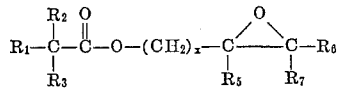

wherein $R_1$ and $R_2$ are alkyl groups; $R_3$, $R_5$, $R_6$ and $R_7$ are members of the class consisting of hydrogen and alkyl groups; the groups $R_1$, $R_2$ and $R_3$ contain a sum total of from 3 to 18 carbon atoms; the groups $R_5$, $R_6$ and $R_7$ contain a total of from 0 to 18 carbon atoms and $x$ is an integer of from 0 to 6.

Preferred epoxy esters are the glycidyl esters having the general formula:

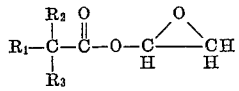

wherein $R_1$ and $R_2$ are alkyl groups, $R_3$ is an alkyl group or a hydrogen, and the total number of carbon atoms in the acid portion ranges from about 9 to 19 with 9 to 11 carbon atoms being especially preferred.

The polyhydroxy compounds which may be used as starting materials for the preparation of the intermediate resin (first stage resin) may be the polyhydric phenols hereinbefore described or may be polyhydric alcohols noted before. Preferably the polyhydric alcohols are aliphatic polyols containing from 2 to 5 hydroxyl groups and from 2 to 8 carbon atoms.

The novel alkyd resins are prepared by the two-step process wherein an intermediate or first-stage resin is prepared which is subsequently reacted with a polycarboxylic acid and/or polycarboxylic acid anhydride.

The first-stage resin may be prepared by either of two general methods.

One method comprises reacting a polyepoxy compound such as the di(epoxyalkyl) diethers of polyhydric phenols with the alpha-branched, saturated aliphatic monocarboxylic acids described hereinbefore. A particularly suitable intermediate (first-stage) resin is prepared by reacting a diglycidyl ether of 2,2-bis(4-hydroxyphenyl) propane with alpha-branched, saturated, aliphatic monocarboxylic acids containing from 9 to 19 carbon atoms and preferably from 9 to 11 carbon atoms.

The first-stage resin, it will be appreciated, is really a new "polyol," that is, the first-stage resin has free hydroxyl groups which can be reacted with the carboxyl groups of polycarboxylic acids and/or anhydrides to form alkyd resins. In general, in order to provide a suitable polyhydroxy first-stage resin it is desirable to utilize the reactants in proportions to provide approximately one epoxy group per carboxyl group. However, an excess of either reactant may be employed as desired. Expressed another way, on a chemical equivalent basis, the ratio of epoxy groups to carboxyl groups will range from about 1:0.8 to about 1:1.2.

A second method comprises reacting a polyhydric compound (polyhydric phenol or polyhydric alcohol) with glycidyl esters of alpha-branched, saturated, aliphatic monocarboxylic acids containing from 9 to 19 carbon atoms in the molecule. Again, the first-stage resin is, in fact, a polyol and may be prepared by reacting the constituents so as to provide, on a chemical equivalent basis, a ratio of epoxy groups to hydroxyl groups in the range of 0.5:1 to 1:1.2 with from 0.7:1 to 0.9:1 being preferred.

It will be appreciated that the above-recited ranges are for convenience only and reflect generally desirable ranges; however, it may be desirable to operate at proportions below and/or above these ranges depending upon the particular polyols and end uses for the alkyds, including color and economics.

In general, the above-prepared first-stage or intermediate resins are prepared under an inert atmosphere where color is a major consideration. The reaction between the polyepoxy compounds and monocarboxylic acids and the reaction between the glycidyl esters and polyhydroxy compounds in the first-stage resin preparation may be conveniently performed at elevated temperatures, generally between 80° C. and 220° C. and more particularly between 140° C. and 180° C. To accelerate the reactions there may be incorporated into the reaction mixture alkalies such as alkali hydroxides and strong organic bases, for example, quaternary ammonium bases, amines, particularly tertiary amines, phosphoric acid, sulfonic acids, Friedel-Crafts catalysts (Lewis acids) such as BF₃, if desired in the form of a complex, for example, with an ether or an amine, and also all other substances known as catalysts for this type of reactions. When phenols or glycidyl ethers thereof take part in the reaction, the most effective catalysts are alkalies. In most other cases, the Lewis acids such as phosphoric acid are to be preferred. If desired, an inert solvent such as xylene and benzene may be present during the reaction.

The reaction mixtures in which the intermediate products have been formed may be used immediately for the preparation of alkyd resins without previous separation of the intermediate products from these reaction mixtures, although these intermediate products may be separated, if desired.

The intermediate products or the reaction mixtures containing the intermediate products are mixed and reacted with polybasic carboxylic acids or anhydrides thereof to prepare the alkyd resins. In most cases, particularly in the intermediate products contain only two free hydroxyl groups in the molecule, a polyol, preferably an aliphatic polyol containing from 2 to 5 hydroxyl groups and from 2 to 8 carbon atoms, such as glycerol, trimethylol propane or pentaerythritol is also incorporated into the mixture.

Illustrative examples of polybasic carboxylic acids include malonic acid, succinic acid, glutaric acid, adipic acid, azeleic acid, sebacic acid, maleic acid, fumaric acid, phthalic acid, tetrahydrophthalic acid, isophthalic acid, terephthalic acid, hexahydrophthalic acid, diglycolic acid and dimerized fatty acids of drying oils such as soyabean oil. Examples of suitable dicarboxylic acid anhydrides are those of succinic acid, glutaric acid, maleic acid, phthalic acid, tetrahydrophthalic acid and hexahydrophthalic acid, as well as Diels-Alder adducts of maleic anhydride with various dienes such as terpenes and cyclopentadiene.

The relative proportions of the first-stage resin and the polycarboxylic acid and/or anhydride may vary widely depending upon the end use properties of the alkyd resin and other considerations. However, it is generally desirable to provide an excess of total hydroxyl groups in the second reaction stage. In general, on a chemical equivalent basis, the ratio of hydroxy groups to carboxyl groups will range from about 1.1:1 to 2.0:1 with from about 1.2:1 to 1.5:1 being preferred. As noted hereinbefore if the second stage resin contains only about two free hydroxyl groups, it may be desirable to add a polyol such as glycerine with the polycarboxylic acid and/or anhydride.

The temperature during the production of the alkyd resins is generally in the range of from 210° C. to 270° C., but in exceptional cases it is occasionally outside this range. If color is a major consideration, an inert atmosphere may be employed.

The alkyd resins produced according to the invention are worked up by the conventional methods to paints, lacquers and varnishes, with components such as pigments, diluents, driers, phenol formaldehydes, urea formaldehydes and melamine formaldehyde resins being added if desired. Paints, lacquers and varnishes formulated with these alkyd resins have outstanding resistance to various chemicals and also have excellent mechanical properties. They are hard, as well as flexible, and give coats with good adhesiveness which are less readily damaged than coats of the usual alkyd resins.

In order to illustrate the invention more fully some specific examples are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

Example I

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into monoolefins by partial hydrogenation. The alkenes were substantially unbranched. The double bonds were present almost exclusively between non-terminal carbon atoms.

The alkenes were converted with carbon monoxide and water into carboxylic acids, the temperature being 60° C., the carbon monoxide pressure 100 atmospheres, a catalyst being used containing $H_3PO_4$ and $BF_3$ in equimolar quantities. The crude carboxylic acids were neutralized with sodium hydroxide after being separated from the catalyst, whereupon the aqueous sodium salt solution was freed from the hydrocarbons still present by finally extracting it with gasoline.

The sodium salt of solution was gradually added to a ten-fold molar quantity of epichlorohydrin, the mixture being maintained at the boiling point and water removed by azeotropic distillation. In this way glycidyl esters of alpha-alkyl monocarboxylic acids having 9 to 11 carbon atoms were obtained.

145 grams of the glycidyl ester were mixed under an oxygen-free nitrogen blanket with 57 grams of diphenylol propane, 100 mg. of NaOH and 12 grams of xylene. The mixture was kept for 3 hours at a temperature of 160° C. At the end of this period the number of epoxy equivalents per 100 grams was 0.029.

17 grams of glycreol and 74 grams of phthalic anhydride were then added to the mixture and the temperature was increased and kept for 2 hours between 240° C. and 250° C. The acid number was found to decrease to 8.3. The product was then mixed with urea formaldehyde resin in a weight ratio of 70:30 and pigmented with titanium white. The mixture was applied to thin steel sheets and baked for 30 minutes at 150° C. The films had the following properties.

Pencil hardness _____ 4H.
Flexibility (mandrel band test) __ ¼-inch.
Resistance to acetic acid (5%)
  after 5 days _____ 10=not affected.
Resistance to NaOH (5%) after
  5 days _____ 8D=good, numerous minute blisters.
Resistance to $H_2SO_4$ (5%) after
  5 days _____ 10=not affected.

Example II

The starting material used was the mixture of monocarboxylic acids referred to in Example I and the reaction product of p,p'-diphenylol propane with epichlorohydrin. The said reaction product mainly consisted of the diglycidyl ether of diphenylol propane, but also contained compounds represented by the formula

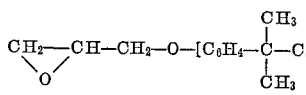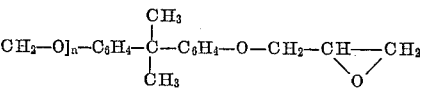

wherein $n$ is a low number.

120 grams of monocarboxylic acids were mixed under an oxygen-free nitrogen blanket with 137 grams of the said reaction product and 6 grams of xylene. The resultant mixture was kept for 2 hours at 200° C. 100 mg. of NaCH were then added and the temperature was kept for a further hour at 200° C.

42 grams of phthalic anhydride were then introduced into the mixture and the temperature was increased to 250° C.–260° C. After continuing the process for 4 hours at the latter temperature, the acid number of the product was found to be 4.

In the manner indicated in Example I, a composition was prepared from the resultant alkyd resin, which composition was applied to steel sheets and baked. On testing the lacquer films, the following results were obtained:

Pencil hardness _____ 4H.
Flexibility _____ ¼-inch.
Resistance to acetic acid (5%)
  after 5 days _____ 9½ (substantially unaffected).
Resistance to NaOH (5%) after
  5 days _____ 8½ (very slightly affected).

Example III

The starting material used was the mixture of glycidyl esters of monocarboxylic acids referred to in Example I and glycerol.

175.5 grams of the glycidyl ester were mixed under an oxygen-free nitrogen blanket with 34.5 grams of glycerol and 690 milligrams of p-toluenesulfonic acid. The mixture was kept for 3 hours at a temperature of 140° C. with stirring. At the end of this period the number of epoxy equivalents per 100 grams was 0.018, which corresponds to a conversion of 95%.

185 grams of phthalic anhydride, 87.75 grams of glycidyl esters referred to above, 46 grams of glycerol and 40 grams of xylene were then added to the mixture and the temperature was increased and kept for 6 hours at 185° C. The water formed was continuously removed by azeotropic distillation.

The product had an acid number 9; the color of a 50% w. solution in xylene was 4–5 on the Gardner-scale, and the viscosity of this solution 109 centistokes.

Stoving enamels were prepared from this alkyd resin and urea formaldehyde resin (UF resin) in the ratios indicated below; they were pigmented with 90 parts of titanium white. The enamels were applied to thin steel sheets and baked for 40 minutes at 150° C.

The films had the following properties:

| | | |
|---|---|---|
| Ratio alkyd resin/UF resin | 80/20 | 70/30 |
| Hardness (Buchholz) | 100 | 111 |
| Flexibility, mandrel bend test, inch | 1/16 | 1/8 |
| Impact resistance, inch/lbs | 20 | 12 |
| Erichsen penetration, mm | 4.7 | 3.2 |
| Gloss, percent | 71 | 63 |
| Resistance to acetic acid vapor after 7 days | 7–8 | 9–10 |

Example IV

The intermediate product referred to in Example III was prepared with montmorillonite as a catalyst.

1775 grams of the glycidyl ester were mixed under an oxygen-free nitrogen blanket with 345 grams of glycerol and 21 grams of montmorillonite. The mixture was kept for 3 hours at a temperature of 140° C. with stirring. At the end of this period the number of epoxy equivalents per 100 grams corresponded to a conversion of 99.7%. The montmorillonite was filtered with suction at 100° C.

The reaction product which consisted essentially of partial esters of polyglyceryl glycerol with branched monocarboxylic aicds was a nearly colorless, slightly viscous, not-distillable oil, stable on heating to 200° C. It was used for the production of alkyd resins as described in Example III.

I claim as my invention:

1. A two-step process for preparing stable alkyd resins which comprises first preparing a hydroxyl-containing intermediate resin and then reacting said intermediate resin in an inert atmosphere at 210° C. to 270° C. with a member of the class consisting of polycarboxylic acids and polycarboxylic acid anhydrides, said intermediate resin being prepared by reacting at a temperature between 80° C. and 220° C. under an inert atmosphere, (1) a diglycidyl ether of a polyhydric phenol and alpha-branched, saturated, aliphatic monocarboxylic acids containing from 9 to 19 carbon atoms, the ratio of epoxy groups to carboxyl groups being in the range of from about 1:0.8 to about 1:1.2 or (2) a polyhydric compound selected from the group consisting of polyhydric phenols and aliphatic polyols and glycidyl esters of alpha-branched, saturated, aliphatic monocarboxylic acids containing from 9 to 19 carbon atoms in the acid portion of the molecule, the ratio of epoxy groups to hydroxyl groups being in the range of from about 0.5:1 to 1:1.2, the ratio of the hydroxyl groups in the intermediate resin to the carboxyl groups in the polycarboxylic compounds being in the ratio of from 1.1:1 to 2.0:1.

2. The process of claim 1 wherein the intermediate resin is prepared by reacting a diglycidyl ether of 2,2-bis(4-hydroxyphenyl)propane with alpha-branched, saturated, aliphatic monocarboxylic acids containing from 9 to 11 carbon atoms.

3. The process of claim 1 wherein the intermediate resin is prepared by reacting glycreol with glycidyl esters of alpha-branched, saturated, aliphatic monocarboxylic acids containing 9 to 11 carbon atoms in the acid portion.

4. The process of claim 1 wherein the intermediate resin is prepared by reacting 2,2-bis(4-hydroxyphenyl) propane with glycidyl esters of alpha-branched, saturated, aliphatic monocarboxylic acids containing 9 to 11 carbon atoms in the acid portion.

5. The process of claim 1 wherein the intermediate resin is reacted with phthalic anhydride.

6. The process of claim 1 wherein glycerol is additionally added to the reaction mixture.

References Cited

UNITED STATES PATENTS

| | | | |
|---|---|---|---|
| 2,720,500 | 10/1955 | Cody | 260—76 |
| 2,970,983 | 2/1961 | Newey | 260—47 |
| 2,980,706 | 4/1961 | Payne | 260—348 |
| 3,041,302 | 6/1962 | Leutner | 260—47 |
| 3,142,686 | 7/1964 | Kreps et al. | 260—348.6 |
| 3,268,483 | 8/1966 | Klootwijk et al. | 260—75 |
| 3,275,583 | 9/1966 | Kloos | 260—22 |
| 3,277,035 | 10/1966 | Vegter et al. | 260—22 |

DONALD E. CZAJA, *Primary Examiner.*

R. W. GRIFFIN, *Assistant Examiner.*